United States Patent [19]

Anker-Holth

[11] 4,044,972
[45] Aug. 30, 1977

[54] AIRCRAFT WITH CIRCULAR WINGS

[76] Inventor: Leif Anker-Holth, Munkedamsveien 55 b, Oslo 2, Norway

[21] Appl. No.: 639,103

[22] Filed: Dec. 9, 1975

[30] Foreign Application Priority Data

Mar. 24, 1975 Norway ............................ 751010

[51] Int. Cl.² .......................................... B64C 15/14
[52] U.S. Cl. ................................ 244/12.2; 244/12.3; 244/13; 244/45 R
[58] Field of Search ............... 244/12 R, 12 C, 12 B, 244/23 R, 23 B, 23 C, 13, 15, 35 R, 45 R, 54; D12/71, 77, 80

[56] References Cited

U.S. PATENT DOCUMENTS

| 989,834 | 4/1911 | Clarke | 244/23 |
|---|---|---|---|
| 1,412,286 | 4/1922 | Jary | 244/12 B |
| 1,925,609 | 9/1933 | Samtarsiero | 244/15 |
| 2,515,587 | 7/1950 | Blondin | 244/35 R |
| 2,663,517 | 12/1953 | Price | 244/15 |
| 2,967,028 | 1/1961 | Ganger | 244/23 R |
| 3,223,355 | 12/1965 | Peterson | 244/12 R |
| 3,362,659 | 1/1968 | Razak | 244/15 |

FOREIGN PATENT DOCUMENTS 102,032 11/1916 United Kingdom ............. 244/35 R

Primary Examiner—Trygve M. Blix
Assistant Examiner—Galen L. Barefoot
Attorney, Agent, or Firm—Cushman, Darby & Cushman

[57] ABSTRACT

An aircraft has two concentric wings of substantially equal diameters, the wings being connected to each other and stayed by an elongated central corridor which is located beneath a central engine duct disposed in the plane of the upper wing.

8 Claims, 3 Drawing Figures

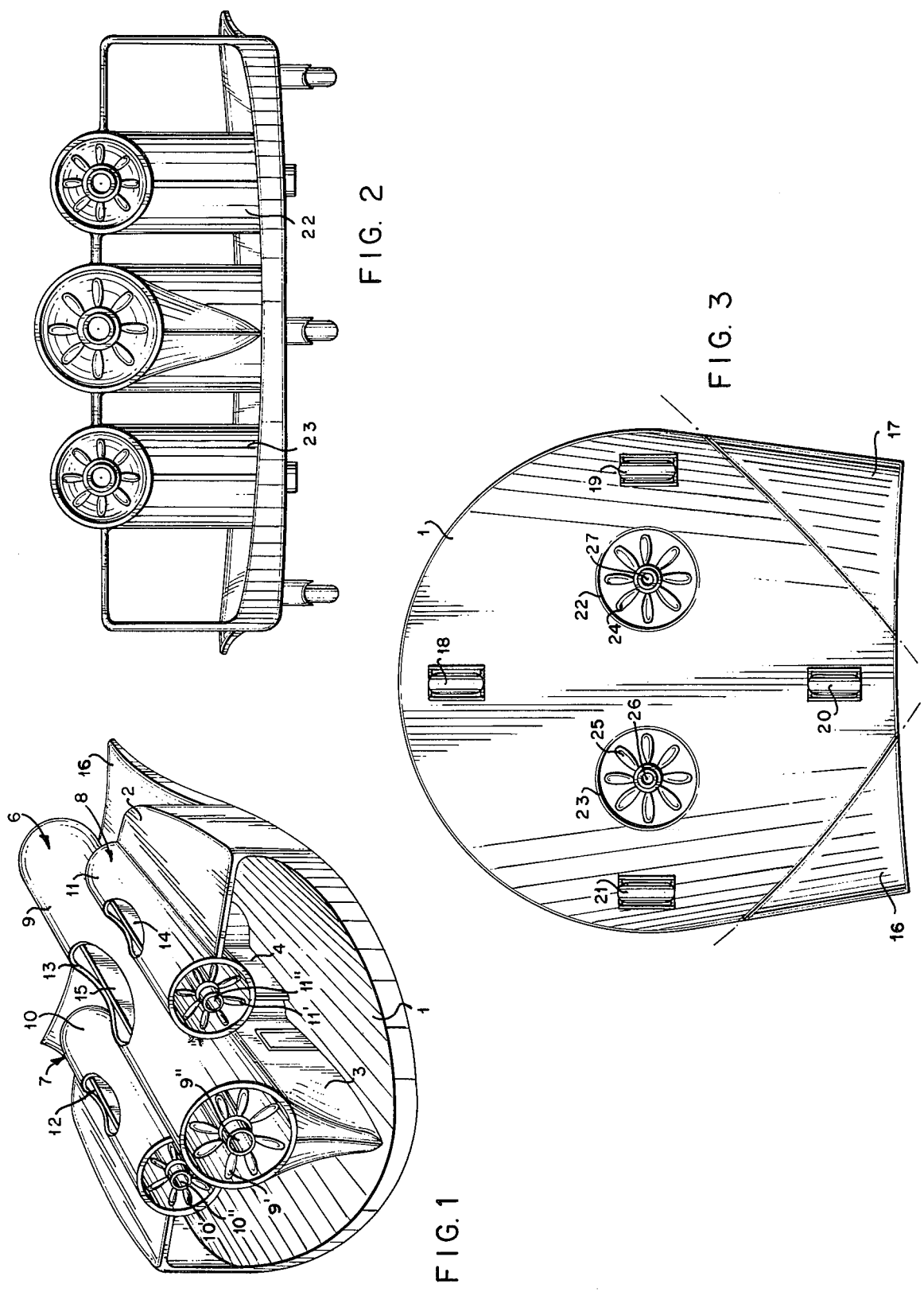

AIRCRAFT WITH CIRCULAR WINGS

The present invention relates to an improvement for aircraft of the type having a circular or nearly circular aerofoil with propulsion means.

There has been a desire for some time to be able to produce an aircraft which can rise vertically or nearly vertically, take off rapidly, maintain a horizontal position in the air, hover in the air and land with precision on an area not much larger than that of the aircraft itself. Obviously, such aircraft offer a number of great advantages. First and foremost the cost of landing fields would be greatly reduced and the noise factor around the airfields would be reduced to a minimum, as the plane could take off almost vertically and the noise would thereby be concentrated in a much more limited area than is the case with conventional aeroplanes. Craft of this type would be specially suited for shorter distances, e.g. shuttle service for the large air terminals.

The helicopters of today fulfill the above requirements, but these aircraft are hampered by a number of disadvantages. In the first place helicopters are very expensive and have a very limited payload. They have, moreover, very little stability against cross-winds while the large diameter rotor causes violent whirling-up of sand and dust, and is a constant danger to personnel and passengers nearby.

Disc-shaped aircraft have been known for some time, e.g. from the applicant's own U.S. Pat. No. 3,262,657. Another example of this type of aircraft is the so-called hovercraft.

The aim of the invention is to provide an improved version of the above-mentioned types of aircraft.

This is accomplished according to the invention by an improvement for aircraft comprising a circular of nearly circular aerofoil with propulsion means, characterized in that at a distance above and concentrically with the circular aerofoil is placed an additional aerofoil which also is circular or forms a part of a circular surface, with essentially the same diameter as the first, and that the propulsion means are composed of three or more ducts or tunnels with propellers placed in the ends, and that all ducts are placed at the upper aerofoil, as the one runs through the centre of the wing and the remaining ducts run symmetrically on both sides of the first one.

A further characteristic of the invention is that the aerofoils are connected with one another and stayed by means of an elongated central corridor which extends straight across the entire lower aerofoil parallel to and directly beneath the central engine duct, and that between the remaining ducts and the lower aerofoil are placed vertical supporting walls. These vertical walls extend preferably up into the ducts for the side engines, dividing each duct into two parts longitudinally.

A further characteristic of the invention is that at the centre part of all ducts are placed openings directed upwards. An additional characteristic of the invention is that in connection with the ducts of the side engines are placed vertically directed ducts extending from the lower aerofoil's underside and opening into the underside of the said engine ducts, approximately at the middle, and that these vertical ducts are equipped with propellers which rotate around a vertical axis, concentric with the ducts. In order to achieve greater efficiency and better balance, all propellers are of the double, counter-rotating type.

The invention will subsequently be explained more in detail with reference to the accompanying schematic drawing which in FIG. 1 shows an embodiment of the aircraft according to the invention, seen in perspective.

FIG. 2 shows a front view of the aircraft, and

FIG. 3 shows a plan view of the aircraft seen from below.

The aircraft according to the invention consists of a lower, circular aerofoil 1 and an upper, partly circular aerofoil 2. The two aerofoils 1 and 2 are stayed in relation to each other primarily by means of a central corridor 3 and additionally by vertical walls 4 and 5 placed symmetrically on either side of this corridor. In the upper aerofoil are arranged three engines, a central engine 6 and two side engines 7 and 8. All engines, 6, 7, 8 consist of ducts 9, 10, 11. At both ends of these ducts are placed propellers 9', 10', 11'. In the drawing, these propellers are shown as single propellers, but a preferred embodiment of the invention assumes that each of these propellers has two propeller rings mounted in sequence which rotate in opposite directions. The propeller hubs for engines have each an opening 9", 10" and 11". Through these openings combustion and cooling air is drawn into the engines which drive the propellers. In the openings 9", 10" and 11" separate fans can be placed.

The engine ducts 9, 10 and 11, are equipped with upward-turned openings, 12, 13 and 14, respectively. The vertical supporting walls 4 and 5 stretch up through ducts 10 and 11 and thus divide these ducts longitudinally, into two equal parts. The middle duct 6 is also equipped with a vertical dividing wall 15.

The lower, circular disc 1 is equipped with flaps or elevators 16 and 17, situated behind the engines 6, 7 and 8. On the underside of this aerofoil 1, are arranged landing wheels 18, 19, 20 and 21.

In connection with the side engines 7 and 8, are arranged transverse ducts 22 and 23. These ducts open out on the underside of the aerofoil 1 and are equipped at this end with counter-rotating propellers 24 and 25. These propellers also have openings 26 and 27 in the hubs. The purpose of these openings is the same as described above in connection with the other engines.

By means of the present invention an aircraft is provided which can rise vertically and take-off very rapidly. When the aircraft is about to take off, the four side engine propellers are set at zero pitch. The front central propeller is set at negative pitch and the rear central propeller at negative pitch. The lifting propellers 24 and 25 are set at maximum positive pitch. Gradually, as the propellers 24 and 25 build up an aircushion/ground effect under the wing, the central propellers produce suction, as both propellers suck down air from the upper side of the aircraft. This double suction from above lifts the aircraft up from the ground. When a desired height is reached, e.g. 1 meter above the ground, the side propellers are set at positive pitch, whereupon the aircraft will move forward. The lifting propellers 24 and 25 continue to lift together with the central propellers, until the desired flying height is reached. The lifting propellers now suck in downward deflected air from in front, i.e. air which passes over the upper wing. At maximum speed or ordinary cruising speed the aircraft will move in a straight line toward its goal. During flight, the airstreams in the duct will be protected against outside air currents, e.g. cross-winds, and operate at maximum efficiency, which is not possible for an ordinary plane because of wing interference. The circular wing is pushed forward by the airflow and produces lift because the wing has aerodynamic, aerofoil shape, which together with the smooth surface gives minimum resistance. Placement of the three ducts side by side keeps the plane's profile drag at a minimum. By separating the upper three activating ducts from the lower wing unit, with an air space in between, a double lifting effect is produced, the one over the upper wing and the other between the upper and the lower part.

The aircraft may be operated by the crew at any desired speed. To brake the speed of the aircraft, the side propellers are set at zero pitch. The central propellers are set at negative pitch. The reversed central airflow will now slow down the aircraft to zero speed and the lifting propellers will control the craft during precision descent and landing. The supporting walls lead the airflow between the upper and lower wing and keep the aircraft on course, protected against cross-winds. The two vertically directed propellers 24 and 25 have a gyroscopic effect which gives the aircraft great stability.

As regards the counter-rotating propellers, these can have a common gear-box and have mutual, collective pitch control in both directions. The central engine can have separate pitch control in both directions.

By means of the invention it has been possible to place the centre of gravity in the centre of the aircraft by means of the circular construction, with equally large supporting surface calculated from the centre. Passengers and freight are allocated space in the lower, circular wing.

According to the invention, the aircraft has built-in ample safety margins. If one of the engines should stop, the others can keep the aircraft in the air. If all the engines should stop simultaneously, the aircraft immediately becomes a parachute, and because the centre of gravity is situated in the centre, it will sink down vertically, while the air passes through the two vertical ducts and is braked further by the lifting propellers. During forward flight, the upward-moving air will mix with the frontal air and pass between the upper and lower wing, so that the pilot can easily adjust and control the craft to land safely on land or on the sea. In an emergency landing on a rough sea, the water will rise a certain height up the two vertical ducts, so that these columns of water will tend to prevent the aircraft pitching or drifting because of the wind.

The lower wing is discus-shaped and has as aerofoil section from front to rear, extending directly under the three ducts with counter-rotating propellers and is stiffened by the vertical walls or fins which laminate the airflow. The air can pass between the upper and lower wing and produces lift. The vertical walls direct the air and keep the craft on course in a cross-wind.

Having described my invention, I claim:

1. In an aircraft an approximately circular lower aerofoil having a leading edge and a trailing edge, an upper at least partly circular aerofoil concentric with and of essentially the same diameter as said lower aerofoil and vertically spaced from said lower aerofoil; a central engine duct disposed generally in the plane of said upper aerofoil and having open forward and rear ends, said central duct extending along the longitudinal center line of the aircraft; means defining a central corridor extending along said lower aerofoil parallel to and directly under said central engine duct, said central corridor being continuous with and connected to both said aerofoils; at least two side engine ducts disposed parallel to and symmetrically on opposite sides of said central duct, said side ducts having open forward and rear ends; a vertical wall extending between each of said side ducts and said lower aerofoils; and propeller means mounted in each end of each duct for rotation about the axis of the respective duct.

2. An aircraft as in claim 1 wherein said vertical walls project into said side ducts and divide them longitudinally into two equal parts.

3. An aircraft as in claim 1 wherein each duct has an upwardly facing opening intermediate its ends.

4. An aircraft as in claim 1 including vertical ducts extending between the lower surface of the lower aerofoil and the approximate middle of each side duct and propeller means mounted in each vertical duct for rotation about a vertical axis.

5. An aircraft as in claim 1 wherein each propeller means includes two counter rotating propellers.

6. An aircraft as in claim 1 including landing wheels carried on the lower surface of the lower aerofoil.

7. An aircraft as in claim 1 wherein each propeller means includes a hub having a central opening through which combustion and cooling air may be drawn in.

8. An aircraft as in claim 1 including at least one flap or elevator carried by the lower aerofoil and extending along the trailing edge thereof.

* * * * *